Figure 1:
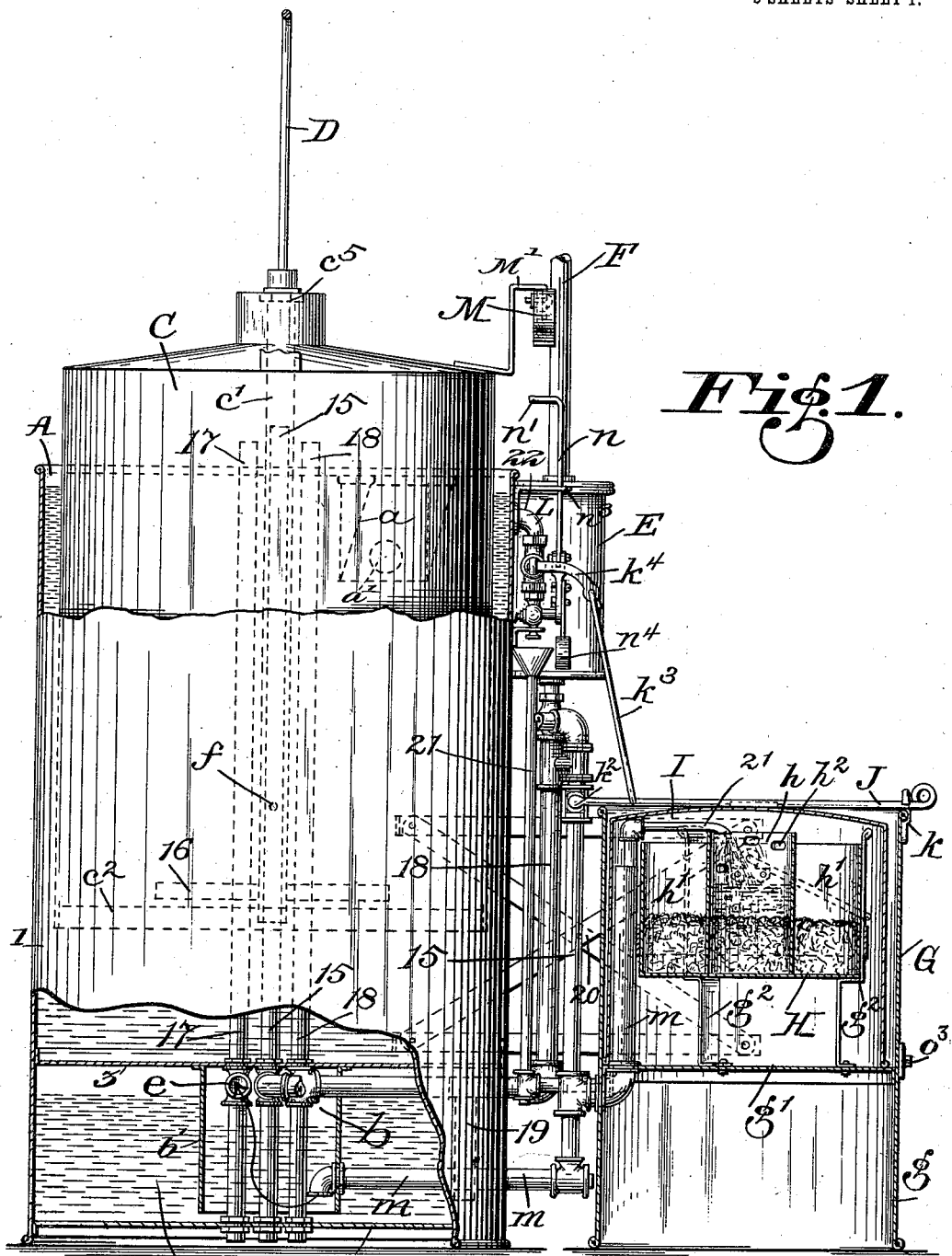

I. MUMMA.
AUTOMATIC WATER FEED ACETYLENE GENERATOR.
APPLICATION FILED SEPT. 30, 1908.

1,014,715.

Patented Jan. 16, 1912.

5 SHEETS—SHEET 1.

WITNESSES:
Jacob T. Scherer,
Anna K. Burnham,

INVENTOR:
Ira Mumma,
BY Frank M. Burnham
ATTORNEY.

I. MUMMA.
AUTOMATIC WATER FEED ACETYLENE GENERATOR.
APPLICATION FILED SEPT. 30, 1908.
1,014,715.
Patented Jan. 16, 1912.
5 SHEETS—SHEET 2.
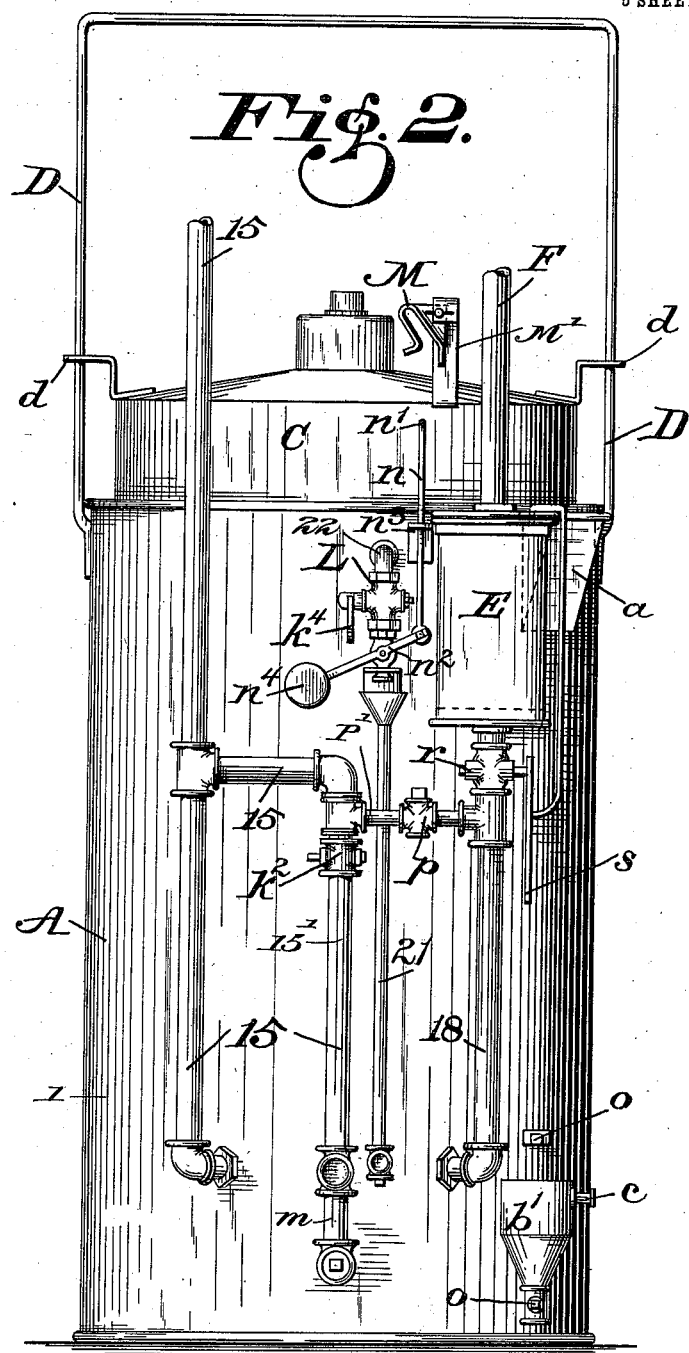

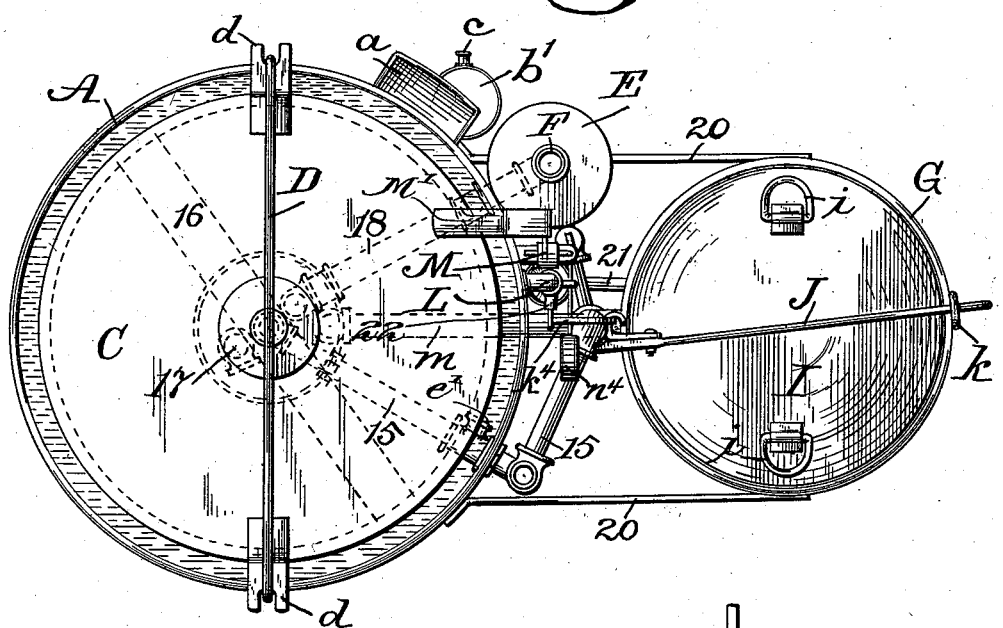
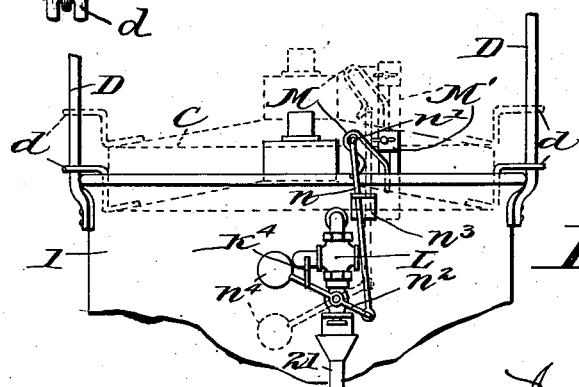

I. MUMMA.
AUTOMATIC WATER FEED ACETYLENE GENERATOR.
APPLICATION FILED SEPT. 30, 1908.
1,014,715.
Patented Jan. 16, 1912.
5 SHEETS—SHEET 4.
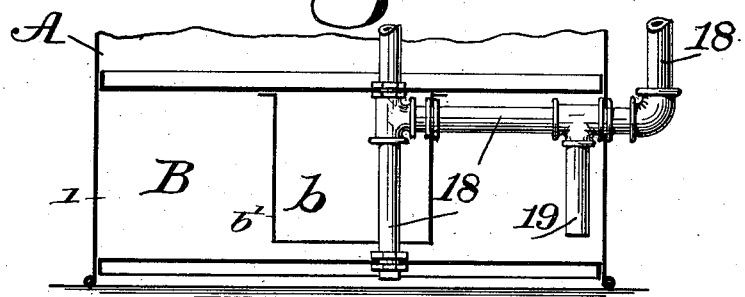
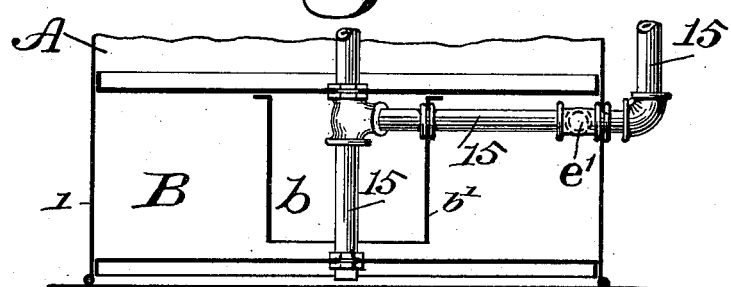
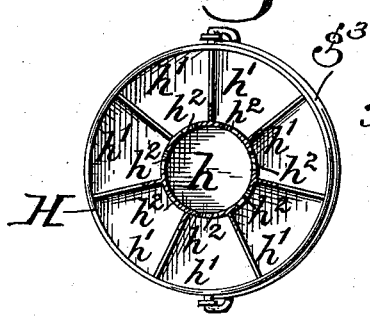
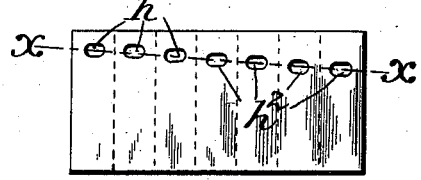

I. MUMMA.
AUTOMATIC WATER FEED ACETYLENE GENERATOR.
APPLICATION FILED SEPT. 30, 1908.
1,014,715.
Patented Jan. 16, 1912.
5 SHEETS—SHEET 5.
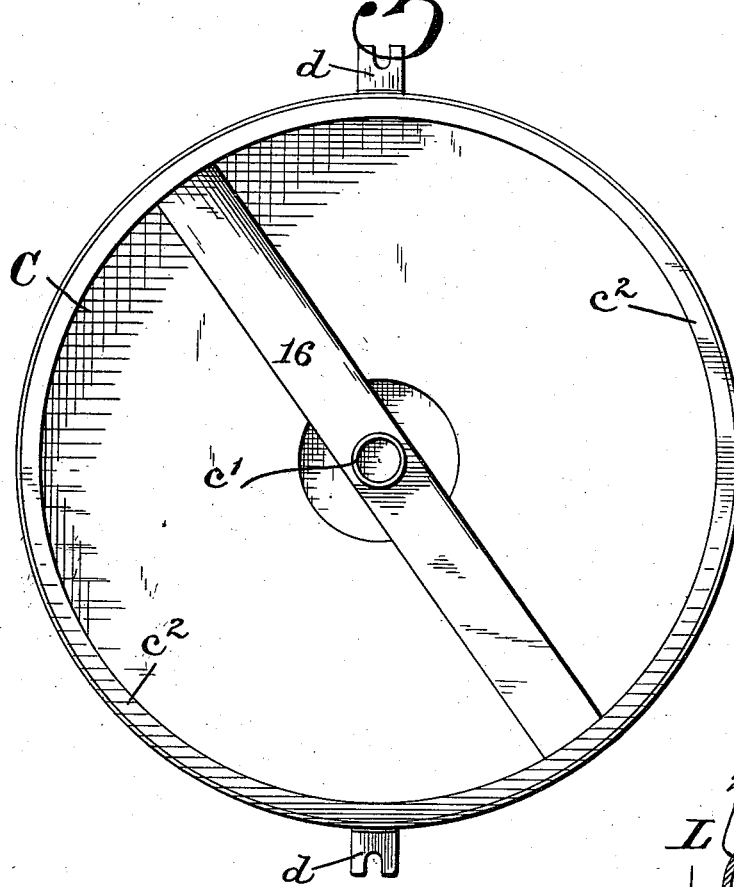
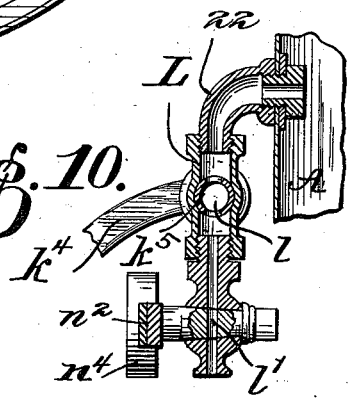
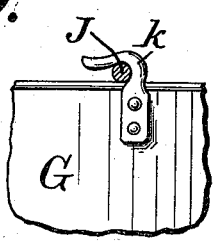
WITNESSES:
Jacob T. Scherer.
Anna H. Burnham.
INVENTOR:
Ira Mumma
BY Frank M. Burnham
ATTORNEY.

UNITED STATES PATENT OFFICE.

IRA MUMMA, OF DAYTON, OHIO.

AUTOMATIC WATER-FEED ACETYLENE-GENERATOR.

1,014,715.   Specification of Letters Patent.   Patented Jan. 16, 1912.

Application filed September 30, 1908. Serial No. 455,521.

*To all whom it may concern:*

Be it known that I, IRA MUMMA, a citizen of the United States, residing at Dayton, in the county of Montgomery and State of Ohio, have invented certain new and useful Improvements in Automatic Water-Feed Acetylene-Generators; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to acetylene gas generators, and more particularly to that type of generator known as the water feed generator.

The object of the invention is primarily to improve and simplify the construction of the generator as a whole; and to render the same more simple and less expensive of construction and operation.

Further, it is an object of my invention to so construct the generator that the water will be fed directly and quickly to the carbid and will be fed in the exact quantities necessary to generate the amount of gas required to supply the burners; to provide improved safe-guards to prevent accidents in the manipulation of the machine; and to so construct the machine as a whole that the parts composing the same can be quickly and easily disconnected and the machine taken apart for repairs, transportation, storage and the like.

With these and other objects in view my invention consists in certain novel features and in certain combinations and arrangements of parts hereinafter to be described, and then more particularly pointed out in the claims.

In the accompanying drawings, Figure 1 is a side elevation, partly in section, of an acetylene gas generator embodying my invention; Fig. 2 is a front elevation of the water reservoir and gasometer shown in Fig. 1, with the gas generator proper removed; Fig. 3 is a plan view of the generator shown in Fig. 1; Fig. 4 is a sectional view of the condensing chamber, showing the service pipe and the relief pipe; Fig. 5 is a sectional view of the condensing chamber, showing the blow-off pipe; Fig. 6 is a plan view, partly in section, of the carbid container; Fig. 7 is a development of the blank from which the central carbid compartment is formed; Fig. 8 is an inverted plan view of the gasometer showing the weight for balancing the same; Fig. 9 is a detail view of the catch for the controlling lever; Fig. 10 is a vertical, sectional view through the double valve for regulating the water supply; and Fig. 11 is a front elevation of this double valve, showing the manner in which it is controlled by the action of the gasometer.

In these drawings I have illustrated one embodiment of my invention and have shown the same as comprising a cylindrical casing 1 having a bottom 2 near the lower end thereof and a horizontal partition or false bottom 3 arranged some distance above the bottom 2 and dividing the space within the casing 1 into upper and lower compartments. The upper compartment A forms a water receptacle while the lower compartment B comprises a condensing chamber. Suitable means are provided for filling the water receptacle A, such as a funnel *a* secured to the outside of the casing 1 and communicating with the interior of the receptacle by means of a port *a'*.

The usual gasometer or inverted bell C is supported within the water receptacle A and is provided with laterally extending arms *d* having their outer ends notched and adapted to engage the upright or vertical members of a bail or double guide rod D and thus maintain the gasometer in a vertical position and permit the same to rise and fall freely as the amount of gas is increased or decreased.

An inlet or supply pipe 17 is supported within the water receptacle A near the center thereof and extends from a point above the top thereof through the partition 3 and is provided at a point beneath said partition with an inlet port *e*. The lower end of this pipe is surrounded by a substantially cylindrical wall *b'* which is secured at its upper end to the lower surface of the partition 3 and extends to within a short distance of the bottom 2 of the condensing chamber and forms within the same a wash-chamber *b*. It will be observed that this wash-chamber is entirely surrounded by water, and, inasmuch as its lower end terminates above the bottom 2 of the condensing chamber, it is in free communication with said chamber and the water can rise and fall therein as the water in the condensing chamber rises and falls. A pipe *m* extends through the walls of the condensing chamber and wash-chamber and has its discharge mouth arranged near the bottom of said wash-chamber. The outer end of this pipe communicates with the generating chamber as hereinafter described and the gas is conveyed from this chamber to the wash-chamber, and, as the pipe *m* extends for a considerable distance through the water in the condensing chamber, the gas is cooled before it is discharged into the water near the bottom of the wash-chamber *b* and is, therefore, thoroughly washed by the water in said chamber as it rises from the discharge mouth of the pipe *m* to the inlet *e* of the pipe 17. A service pipe 18 is also mounted within the water receptacle and extends from a point above the top thereof and within the gasometer through the partition 3 and thence laterally through the wall *b'* of the wash-chamber and the wall of the condensing chamber B, thence upwardly along the outer side of the casing 1 where it is connected with a purifier E, which, in turn, is connected at its other end with a house pipe F, which, in effect, forms an extension of the service pipe 18. An escape or blow-off pipe 15 is also arranged within the water receptacle A and extends from a point above the top of the receptacle, and preferably slightly above the upper ends of the pipes 17 and 18, through the partition 3 into the wash-chamber *b*, thence laterally through the wall *b'* of said wash-chamber and through the wall of the condensing chamber B, whence it extends upwardly along the side of the casing 1 to a point outside of the building in which the generator is installed. The upper end of the pipe 15 extends into and is telescoped by a tube or pipe *c'* carried by the gasometer. This tube is secured at its upper end to the central dome of the gasometer, as shown at $c^5$ and extends downward about the waste pipe 15 to a point near the bottom of the gasometer. At a point some distance above its lower end the tube *c'* is provided with an aperture or apertures *f*. Should the accumulation of gas in the gasometer be sufficient to carry the same upward beyond a predetermined point the aperture *f* in the tube *c'* will be carried above the level of the water in the gasometer and the gas will pass through the opening *f* into the waste pipe 15 and thus escape into the open air. As soon as sufficient gas has escaped to allow the gasometer to return to its normal position the opening in the tube will be again submerged and the flow of gas through the escape pipe cut off. The lower end of the tube *c'* is preferably supported by a transverse bar or brace 16 extending across the lower end of the axle and secured at its opposite ends to the walls thereof. This brace not only serves to support the tube *c'* in its proper position, but also to reinforce the lower end of the gasometer. The lower end of the gasometer is weighted to cause the same to balance properly and prevent the tube *c'* from binding upon the pipe 15. This I preferably accomplish by securing to the gasometer an annular ring or band, $c^2$, of metal, which not only maintains the gasometer in perfect balance, but also further strengthens the lower end of the gasometer and increases the pressure on the gas within the same. The waste pipe 15 is provided at a point within the condensing chamber B with an inlet opening *e'*, by means of which any accumulations within that chamber may be carried off.

The service pipe 18 is provided with means for permitting the escape of the gas therefrom in case of over-pressure brought about by abnormal conditions. This means of escape preferably comprises a nipple or short pipe 19 connected with the horizontal portion of the service pipe within the condensing chamber B and extending for some distance beneath the surface of the water in said chamber. Normally, this pipe would be water sealed and no gas would pass through the same, but, should the pressure within the pipe 18 rise to the danger point, this pressure would be sufficient to force the gas through the pipe 19 and into the condensing chamber, whence it would pass through the opening *e'* into the escape pipe 15.

Any suitable means may be provided for filling the condensing chamber with water and maintaining the same at the proper level therein. This I preferably accomplish by means of a funnel $b^2$ supported on the outside of the casing 1 and communicating with the condensing chamber near the bottom thereof. By providing the funnel $b^2$ with an outlet *c* at the height at which it is desired to maintain the water within the chamber the funnel will serve as an outlet and prevent the water rising within the chamber beyond the level of the outlet pipe *c*.

The gas generator proper is here shown as comprising a casing *g*, preferably circular in cross section and having a partition *g'* arranged at a point between the upper and lower ends thereof and forming in the upper part thereof a water receptacle G. This casing *g* is rigidly but removably secured to the casing 1, containing the water receptacle A by means of bars 20 extending between the two casings and secured thereto by means of bolts. Mounted within the water receptacle G are a plurality of carbid pans which, in the present instance, comprise a single receptacle H divided into a series of carbid containers. The receptacle H is preferably cylindrical in shape and is provided with a bail $g^3$, thus giving the same the general appearance of a bucket. This receptacle is supported some distance above the bottom $g'$ of the water receptacle G by means of standards $g^2$ which are secured to the bottom $g'$ and are provided with shoulders upon which the receptacle H rests. The several carbid containers formed within the receptacle H comprise a central carbid container $h$, which is preferably circular in cross section and is here shown as extending a short distance above the top of the receptacle H. The space lying between the wall of the container $h$ and the wall of the receptacle H is divided by radial partitions into a series of radial compartments $h'$, each of which is in communication with the central container $h$ by means of an opening $h^2$ in the wall of said central container. These several openings $h^2$ are arranged at different distances from the bottom of the central container, preferably in a regular order or step by step manner, as shown in the development of the wall of said central container in Fig. 7. The water is fed directly to the central container $h$ in the manner hereafter to be described and the amount of carbid in this container is such that by the time the water has reached the level of the lowermost opening $h^2$ the carbid within said central container will have been exhausted. As soon as the water reaches the level of the lowermost opening $h^2$, it passes through that opening into the corresponding carbid container $h'$ and immediately attacks the carbid therein, thus continuing the generation of gas. The amount of carbid in this container is likewise such that, by the time the water has reached the level of the opening therein, the carbid within said container will have been exhausted. The water in the central container will then rise to the level of the next higher opening $h^2$ and will enter the corresponding container $h'$ directly from the central container, this operation being continued until all the containers have been filled with water and all the carbid within the receptacle exhausted, when it becomes necessary to empty and recharge the several containers which is easily accomplished by removing the receptacle by means of a bail $g^2$.

It will be noted that the carbid containers are inclosed within an inverted bell or dome I, which is of such a size as to completely inclose the receptacle H and to extend downwardly and rest upon the bottom of the water receptacle G, thus forming a water seal which effectually prevents the escape of gas from the generating chamber formed within the same. This bell or dome I is provided with suitable handles $i$ to enable the same to be readily removed.

The water is preferably conveyed to the central carbid container $h$ by means of a pipe 21 supported at one side of the casing 1 and having a funnel-shaped upper end. This pipe extends downwardly to a point beneath the bottom $g'$ of the water receptacle G of the generator, thence laterally through the wall of the casing $g$ and upwardly through the bottom $g'$ of said receptacle to a point above the receptacle H, where it is provided with a laterally extending arm which discharges into the central container. This horizontal arm is swiveled to the vertical portion of the pipe to enable the same to be swung to one side to permit the removal of the receptacle H. The U-shaped portion of the pipe 21 forms a water seal which effectually prevents the escape of gas through said pipe. The water is preferably conveyed to the pipe 21 from the water receptacle A through a pipe 22 communicating with said water receptacle A and having its discharge end supported above the funnel-shaped upper end of the water supply pipe 21. The pipe 22 is provided with a double valve L which preferably comprises two turn plug valves $l$ and $l'$. The upper valve plug $l$ is provided with an arm $k^4$ which is connected by a rod $k^3$ with a locking bar J, which is pivotally connected at one side of the water receptacle G of the generator proper, extends across the top of the same in a position to lock the inverted bell I in position therein and is locked against movement by means of a spring catch $k$ secured to the wall of the water receptacle G. The arrangement of the arm $k^4$ and rod $k^3$ is such that, when the bar J is in position to lock the bell or cover I in position, the valve plug $l$ will be in its open position, but when the bar J is raised to permit the removal of the receptacle H, the valve plug $l$ will be turned into a position to cut off the flow of water through the valve, thereby automatically stopping the flow of water to the generator when the retaining bar J is moved into such a position as to permit the generator to be opened. The interior of the generating chamber is connected with the waste pipe 15 by means of a branch pipe 15'. In the present instance the pipe 15' is shown as connected at one end to the gas pipe $m$ leading from the generating chamber to the wash chamber $b$ and at its other end to the waste pipe 15. A valve $k^2$ controls the flow of gas through the pipe 15' and this valve, in turn, is controlled by the retaining bar J. The bar J is preferably connected directly to the stem of the valve $k^2$ and this valve member forms the pivotal center for the retaining bar. The valve $k^2$ is so arranged that, when the retaining bar is in its normal position to secure the bell or cover I in position, the pipe 15' will be closed against the passage of gas, but, when the bar J is moved into position to permit the removal of the receptacle H, the pipe 15′ will be opened and will thus place the waste pipe 15 in open communication with the interior of the generating chamber, thereby permitting any gas remaining in that chamber to escape. The flow of water through the pipe 22, to pipe 21 is also automatically controlled by the rise and fall of the gasometer C, and, to this end, the valve plug $l'$ has secured thereto an arm $n^2$ which extends on the opposite sides of said valve plug and is provided at one end with a weight $n^4$ and at its other end is connected to a rod $n$ which extends upwardly through a guideway or bracket $n^3$ and has at its upper end an inwardly extending finger $n'$. Mounted on the gasometer C and arranged directly above the inwardly extending finger $n'$ of the rod $n$ is an operating member M which preferably comprises a strip of metal bent upon itself to form a guideway and secured to a bracket M′ carried by the gasometer in such a manner as to cause said guideway to extend at an inclination to the finger $n'$ of the rod $n$. When the operating member M is out of engagement with the finger $n'$ the weight $n^4$ will retain the valve plug $l'$ in its closed position, thus cutting off the flow of water to the carbid container. As the supply of gas in the gasometer is consumed and it moves downwardly, the finger $n'$ of the rod $n$ will enter the guideway in the member M and the continued downward movement of the gasometer will cause this member to force the rod $n$ downward and open the valve $l'$, thus again admitting the water to the carbid container. The further generation of gas which immediately follows the admission of water to the carbid again elevates the gasometer C, and, as it rises, the guideway M and the finger $n'$ on the rod $n$ move upward therewith, the weight $n^4$ moving the lever $n^2$ about its pivotal center and thus retaining the finger $n'$ in the guide M until the lever has completed its movement when it is permitted to escape from the guideway. This movement of the lever $n^2$ moves the valve plug $l'$ into its closed position and again cuts off the flow of water to the carbid container, thus again stopping the generation of gas until the gas in the gasometer has been partially consumed.

Means are also provided for connecting the service pipe 18 with the waste pipe 15 in the case of an emergency. This means preferably consists of a short pipe $p'$ connecting the service pipe with the branch pipe 15′ which is connected with the waste pipe 15. The pipe $p'$ has a cut-off $p$, by means of which the service pipe can be instantly connected with the waste pipe. The service pipe is also provided with a cut-off $r$ having an operating handle $s$, by means of which the house pipe F can be cut off from the generator if desired. I have also provided the water receptacle A, condensing chamber B and water receptacle G of the generator with outlets controlled by plugs $o'$, $o^2$ and $o^3$, respectively, by means of which these receptacles can be drained.

The operation of the device will be readily understood from the description of the operation of the several parts thereof, and it will be apparent that in a generator as herein constructed, the water is fed directly and quickly to the carbid, it being discharged directly onto the carbid in the central container $h$, thus securing a quick generation of gas and likewise enabling the flow of water to the carbid to be instantly cut off, this flow stopping the instant either valve of the double valve L is closed. Further, inasmuch as the water flows directly from the central container $h$ to the particular container in which the gas is being generated, there is but a small quantity of water to drain into that container from the carbid container $h$ after the flow of water has been cut off in the pipe 21. As is well known, the surface of a body of water will rise some distance above the edge of an opening before it flows through that opening, and, if the surface of this water is of any considerable extent there remains a considerable amount of water which will drain through the opening after the supply has been cut off from the main body. When this condition of affairs exists in a generator it causes a large amount of "after generation" and a consequent waste of carbid. In the present construction the body of water which feeds the several carbid containers is of small area, and, consequently, there is but a very small flow of water to the carbid container $h'$ after the supply of water has been cut off from the central container. It will further be noted that the carbid receptacle H as a whole sets in the water contained in the receptacle G which extends beneath the same and surrounds it to a point near the upper end thereof, thus maintaining the carbid and the interior of the generating chamber at a low temperature which is important for the successful manufacture of gas. Again, it will be observed that I have provided means for positively controlling the flow of water to the central carbid container, which means is controlled by the rise and fall of the gasometer; and also that I have provided other means for controlling the flow of water to the carbid container, which means is controlled by the movement of the retaining bar, by means of which the cover or dome is secured in position within the water receptacle G. Likewise, it will be observed that the movement of the retaining bar J into its operative or inoperative position connects or disconnects the interior of the generating chamber with the waste pipe so that, before the generating chamber can be opened, the interior thereof must be connected with the waste pipe to permit the gas to escape. In this manner it will be noticed that the movement of the retaining bar J into its inoperative position, i. e., into a position to permit the removal of the cover or dome I, will simultaneously cut off the flow of water to the carbid containers, independently of the position of the automatically controlled valve, and will, at the same time, connect the generating chamber with the waste pipe. Thus, the generation of gas is stopped and the gas within the chamber escapes before the generator can be opened. It will be obvious, therefore, that no water can enter the carbid container to start the generation of gas until the closure is in position and the retaining bar J in its locking position. If the gas in the bell C is low and the valve $l'$ is open the water will enter the central container and start the generation of gas as soon as the movement of the bar J opens the valve $l$. Otherwise, the flow of water to the containers will not begin until sufficient gas has been consumed to permit the bell to drop far enough to open the valve $l'$. Moreover, it will be observed that by combining a positive automatic control of the flow of water with the arrangement of carbid containers, by means of which the water is fed directly to the carbid, I am enabled to feed to the carbid the exact amount of water required to generate the gas necessary for immediate consumption, thereby preventing "after generation" and maintaining the generator at a low temperature and thus preventing the dangerous polymerization or splitting up of the acetylene gas into other hydrocarbon gases of inferior quality, which often occurs in improperly constructed generators.

It will be understood that while I have shown and described the carbid containers as comprising a central container and several other containers grouped about the said central container, the term "central container" is used to designate that container into which the water is first discharged and from which it is distributed successively to the other containers, and it is not essential that this "central container" should form the center of the group of containers. I further wish it to be understood that I do not desire to be limited to the details of construction shown and described, for obvious modifications will occur to a person skilled in the art.

Having thus fully described my invention, what I claim as new and desire to secure by Letters Patent, is:—

1. In a device of the character described, a generator comprising a receptacle forming a generating chamber, a closure for said receptacle, a plurality of containers mounted within said chamber and each adapted to contain a quantity of carbid, and means for starting the generation of gas by introducing water into one of said containers for the first time after said closure is in place, said container being in direct commuication with each of the other containers.

2. In a device of the character described, a generator comprising a receptacle forming a generating chamber, a closure therefor, a carbid container mounted in said chamber, means for starting the generation of gas by introducing water into said container for the first time after said closure is in place, a plurality of other containers arranged about the exterior of the first-mentioned container, said first-mentioned container having a series of openings in the wall thereof arranged at different distances from the bottom thereof and connecting said first-mentioned container with each of the other containers.

3. In a device of the character described, the combination, with a gasometer, and a receptacle forming a generating chamber, of a plurality of containers mounted within said chamber and each adapted to contain a quantity of carbid, means for feeding water to the carbid in one of said containers to start the generation of gas, said container being in direct communication with each of the other containers, and means actuated by the rise and fall of said gasometer to control the flow of water to said container after the generation of gas has begun.

4. In a device of the character described, the combination, with a gasometer, and a receptacle forming a generating chamber, of a carbid container mounted within said chamber, means for feeding water to said carbid container to start the generation of gas, a plurality of other carbid containers arranged about the first-mentioned container, said first-mentioned container having a series of openings in the wall thereof arranged at different distances from the bottom thereof and connecting said first-mentioned container with each of the other containers, and means actuated by the rise and fall of said gasometer to control the flow of water to said container after the generation of gas has begun.

5. In a device of the character described, a generator comprising a receptacle, a closure therefor, a plurality of containers mounted within said receptacle and each adapted to receive a quantity of carbid, one of said containers being in direct communication with each of the other containers, a water supply pipe extending into said receptacle and having a swiveled arm extending above and adapted to discharge into that container which is in communication with each of the other containers, and means for controlling the flow of water through said pipe.

6. In a device of the character described, a generator comprising a receptacle adapted to contain a quantity of water, a bell-like closure adapted to be inserted in said receptacle and to form a generating chamber within the same, a carbid receptacle mounted within said generating chamber and comprising a series of compartments each adapted to contain a quantity of carbid and one of said compartments, being in communication with each of the other compartments, means for removably supporting said carbid receptacle at a point above the bottom of said water receptacle, and means for feeding water into that compartment of said receptacle which is in communication with the other compartments thereof.

7. The combination in a device for the automatic generation of gas from calcium-carbid, of a water-reservoir provided with a discharge means; a gasometer operatively connected with said reservoir; a gas-generator having an open water chamber and provided with a carbid-bucket formed with a well or central carbid-compartment, a plurality of carbid-compartments arranged about said central compartment, means of communication leading from said central compartment in successive steps to each of said other compartments; a water-supply leading to said generator; a removable lid or cover adapted to rest on said generator and inclose said bucket; and a controlling-lever to retain said cover in position and control the flow of water to said generator by its movements; all substantially as described.

In testimony whereof, I affix my signature, in presence of two witnesses.

IRA MUMMA.

Witnesses:
J. B. REED,
A. R. WULFF.

---

Copies of this patent may be obtained for five cents each, by addressing the "Commissioner of Patents Washington, D. C."